(12) United States Patent
Pilskalns et al.

(10) Patent No.: US 10,157,501 B2
(45) Date of Patent: Dec. 18, 2018

(54) CAMERA ANGLE VISUALIZATION FOR AERIAL VEHICLE FLIGHT PLAN

(71) Applicant: Skyyfish, LLC, Missoula, MT (US)

(72) Inventors: Orest Jacob Pilskalns, Missoula, MT (US); Colin Brian Heidtman, Florence, MT (US)

(73) Assignee: SKYYFISH, LLC, Missoula, MT (US)

( * ) Notice: Subject to any disclaimer, the term of this patent is extended or adjusted under 35 U.S.C. 154(b) by 159 days.

(21) Appl. No.: 15/401,056

(22) Filed: Jan. 8, 2017

(65) Prior Publication Data

US 2017/0200311 A1    Jul. 13, 2017

Related U.S. Application Data

(60) Provisional application No. 62/276,505, filed on Jan. 8, 2016, provisional application No. 62/383,354, filed on Sep. 2, 2016.

(51) Int. Cl.

| G06T 19/20 | (2011.01) |
| G06T 19/00 | (2011.01) |
| G06T 17/05 | (2011.01) |
| H04N 7/18 | (2006.01) |
| H04N 5/232 | (2006.01) |
| B64C 39/02 | (2006.01) |
| B64D 47/08 | (2006.01) |
| G01C 21/00 | (2006.01) |

(52) U.S. Cl.
CPC .......... *G06T 19/003* (2013.01); *B64C 39/024* (2013.01); *B64D 47/08* (2013.01); *G01C 21/00* (2013.01); *G06T 17/05* (2013.01); *G06T 19/20* (2013.01); *H04N 5/23216* (2013.01); *H04N 7/183* (2013.01); *B64C 2201/024* (2013.01); *B64C 2201/127* (2013.01); *B64C 2201/146* (2013.01); *G06T 2219/2012* (2013.01); *H04N 7/185* (2013.01)

(58) Field of Classification Search
None
See application file for complete search history.

(56) References Cited

U.S. PATENT DOCUMENTS

| 9,513,635 B1* | 12/2016 | Bethke ................... G01C 21/20 |
| 2010/0004798 A1* | 1/2010 | Bodin ..................... G01S 19/14 |
| | | 701/2 |
| 2011/0310087 A1* | 12/2011 | Wright, Jr. .............. G06T 13/80 |
| | | 345/419 |
| 2015/0130799 A1* | 5/2015 | Holzer ................ G06F 3/04842 |
| | | 345/420 |

(Continued)

*Primary Examiner* — Jayanti K Patel
*Assistant Examiner* — Shadan E Haghani
(74) *Attorney, Agent, or Firm* — Cotman IP Law Group, PLC

(57) ABSTRACT

Points of interest are added to a flight plan overlaid on a map. Camera switch-on and switch-off locations are automatically added to the nearest leg of the flight plan. An observation triangle joining the point of interest and the camera on and off locations is displayed so that the user can easily visualize the range of angles from which the point of interest is viewed. The triangle may be colored and/or partially transparent. Adjustment of the camera on and off locations is possible, with the system automatically adjusting the observation triangle. In a similar way, lines of interest and curves of interest may be added to the flight plan.

24 Claims, 5 Drawing Sheets

(56) References Cited

U.S. PATENT DOCUMENTS

2015/0142211 A1* 5/2015 Shehata ................ H04N 7/181
　　　　　　　　　　　　　　　　　　　　　　701/2
2016/0307447 A1* 10/2016 Johnson ............... G05D 1/0044

* cited by examiner

CAMERA ANGLE VISUALIZATION FOR AERIAL VEHICLE FLIGHT PLAN

This application claims the benefit of U.S. provisional patent application Ser. No. 62/276,505, filed on Jan. 8, 2016, and the benefit of U.S. provisional patent application Ser. No. 62/383,354, filed on Sep. 2, 2016, all of which are herein incorporated by reference in their entirety for completeness of disclosure.

TECHNICAL FIELD

This application relates to a method and system for camera (or sensor) angle visualization for objects of interest (OOI) that are to be photographed, filmed or otherwise observed during the flight of an unmanned aerial vehicle (UAV) or manned aerial vehicle (MAV). In particular, this application relates to the automatic overlay, on a map, of a range of camera (or sensor) angles that are to be used by the UAV or MAV.

BACKGROUND

Flight software generally has two major functional pieces: waypoints, which are navigational points that the craft flies through; and points of interest (POI), which are point locations on a map, that the onboard sensors point at for some amount of time. The amount of time during which the sensors observe the POIs is usually determined by parameters that are input to a waypoint.

This background information is provided to reveal information believed by the applicant to be of possible relevance to the present invention. No admission is necessarily intended, nor should be construed, that any of the preceding information constitutes prior art against the present invention.

SUMMARY OF INVENTION

The present invention is directed to a method and system that uses automatic drag and drop lines for observing OOIs using a UAV or MAV. It includes an automatic and visually expressive way of creating on and off points associated with OOIs, and a unique method of visualizing the camera angles for an OOI. The method allows the user to tell an onboard sensor, such as a camera, to focus on an OOI. By clicking on a digital map that contains some waypoints, on and off points for the camera are automatically generated. The automatically generated on and off points are easy to adjust, and a semi-transparent colored, swept out area overlaid on the map provides a visual cue of the camera angle coverage. The display of such a swept out area is necessary for the visualization, as is its automatic, real-time adaption as the on and off points are adjusted by the user.

The system disclosed herein can be used with POIs, lines of interest (LOI) or curves of interest (COI).

Disclosed herein is a method for visualizing sensor angle with respect to an object of interest (OOI) that is to be observed by a sensor on an aerial vehicle, comprising: displaying, by a processor, a map on a screen; receiving, by the processor, an input identifying the OOI; displaying, by the processor, a first line from the OOI, wherein the first line represents an angle at which the sensor is switched on; and displaying, by the processor, a second line from the OOI, wherein the second line represents an angle at which the sensor is switched off; wherein an angle between the first and second lines represents a range of sensor angles from which the sensor observes the OOI.

In some embodiments, the aerial vehicle is an unmanned aerial vehicle (UAV), the method further comprising: receiving, by the processor, an input of at least two waypoints; displaying, by the processor, the waypoints on the screen; displaying, by the processor, a flight path joining the waypoints, wherein the first line and second line both terminate on the flight path; displaying, by the processor, an On slider where the first line terminates, at a first location on the flight path, wherein the first location is where the sensor is switched on; and displaying, by the processor, an Off slider where the second line terminates, at a second location on the flight path, wherein the second location is where the sensor is switched off.

In some embodiments, the method further comprises: receiving, by the processor, an adjustment to the locations of one or both of the On slider and the Off slider, each location being adjustable along the flight path; and moving, by the processor, said first and/or second lines such that they each remain terminated at the On slider and Off slider respectively.

In some embodiments, the method further comprises: calculating, by the processor, a flight plan based on the waypoints and the flight path; calculating, by the processor, a sensor plan based on the first and second locations and a location of the OOI; and transmitting, by the processor, the flight plan and the sensor plan to the UAV.

In some embodiments the OOI is a line of interest and the flight plan includes an instruction to pan the sensor uniformly along the line of interest.

In some embodiments, the sensor plan comprises an instruction to gradually alter the sensor angle from the angle at which the sensor is switched on to the angle at which the sensor is switched off as the UAV flies from the first location to the second location, such that the sensor continually points at the OOI between the first and second locations.

In some embodiments, the flight plan can be manually interrupted and resumed.

In some embodiments, the flight plan includes an instruction to lock the sensor onto the OOI between the location where the sensor is switched on to the location where the sensor is switched off.

In some embodiments, the OOI is an electrical power line and the flight plan includes an instruction to maintain the UAV at a constant level of electric field in relation to the electrical power line while flying between the first location and the second location.

Some embodiments include displaying, overlaid on the map, a shaded, semi-transparent area enclosed by the first line, the second line, the OOI and the flight path.

Some embodiments include: receiving, by the processor, an input identifying a further OOI; displaying, by the processor, a third line from the OOI to the flight path, wherein the third line represents an angle at which the sensor is switched on; and displaying, by the processor, a fourth line from the OOI, wherein the fourth line represents an angle at which the sensor is switched off; wherein an angle between the third and fourth lines represents a range of sensor angles from which the sensor observes the further OOI.

Some embodiments include: displaying, by the processor, a further On slider where the third line terminates, at a third location on the flight path, wherein the third location is where the sensor is switched on; and displaying, by the processor, a further Off slider where the fourth line terminates, at a fourth location on the flight path, wherein the fourth location is where the sensor is switched off; wherein the first, second, third and fourth locations are arranged consecutively on the flight path.

In some embodiments, the OOI is a line of interest, the method further comprising: displaying, by the processor, first and second inner sliders on the flight path between the On slider and Off slider; wherein the sensor is aimed perpendicularly to the flight path between the first and second inner sliders.

Some embodiments include receiving, by the processor, an adjustment to the locations of one or both of the waypoints; moving, by the processor, said On slider and Off slider such that they remain on the flight path; and moving, by the processor, said first and/or second lines such that they each remain terminated at the On slider and Off slider respectively.

In some embodiments the OOI is a point of interest, a line of interest, or a line of interest that crosses underneath the flight path.

In some embodiments: the flight path is a straight line; the flight path is a curve; or the OOI is a line of interest and the flight path repetitively approaches and retreats from the line of interest.

In some embodiments the OOI is a curve of interest and the angle between the first and second lines is 0°.

Also disclosed herein is a system for visualizing sensor angle with respect to a object of interest (OOI) that is to be observed by a sensor on an aerial vehicle, comprising: a processor; a screen; and a memory storing computer readable instructions, which, when executed by the processor, cause the processor to: display a map on the screen; receive an input identifying the OOI; display, on the screen, a first line from the OOI, wherein the first line represents an angle at which the sensor is switched on; and display, on the screen, a second line from the OOI, wherein the second line represents an angle at which the sensor is switched off; wherein an angle between the first and second lines represents a range of sensor angles from which the sensor observes the OOI.

In some embodiments, the aerial vehicle is an unmanned aerial vehicle (UAV) and the computer readable instructions, when executed by the processor, further cause the processor to: receive an input of at least two waypoints; display the waypoints on the screen; display, on the screen, a flight path joining the waypoints, wherein the first line and second line both terminate on the flight path; display, on the screen, an On slider where the first line terminates, at a first location on the flight path, wherein the first location is where the sensor is switched on; and display, on the screen, an Off slider where the second line terminates, at a second location on the flight path, wherein the second location is where the sensor is switched off.

In some embodiments, the computer readable instructions, when executed by the processor, further cause the processor to: receive an adjustment to the locations of one or both of the On slider and the Off slider, each location being adjustable along the flight path; and move said first and/or second lines such that they each remain terminated at the On slider and Off slider respectively.

In some embodiments, the computer readable instructions, when executed by the processor, further cause the processor to: calculate a flight plan based on the waypoints and the flight path; calculate a sensor plan based on the first and second locations and a location of the OOI; and transmit the flight plan and the sensor plan to the UAV.

In some embodiments, the system further comprises: the UAV, configured to execute the flight plan; and the sensor, configured to execute the sensor plan.

In some embodiments, the computer readable instructions, when executed by the processor, further cause the processor to: display, overlaid on the map, a shaded, semi-transparent area enclosed by the first line, the second line, the OOI and the flight path.

In some embodiments, the system further comprises a smart gimbal mounted on the aerial vehicle, wherein the computer readable instructions, when executed by the processor, further cause the processor to: receive an input of at least two waypoints; display the waypoints on the screen; display, on the screen, a flight corridor joining the waypoints, wherein the first line and second line both terminate in the flight corridor; display, on the screen, an On slider where the first line terminates, at a first location in the flight corridor, wherein the first location is where the sensor is switched on; and display, on the screen, an Off slider where the second line terminates, at a second location in the flight corridor, wherein the second location is where the sensor is switched off; calculate a flight plan based on the waypoints and the flight corridor; calculate a sensor plan based on the first and second locations and a location of the OOI; and transmit the flight plan and the sensor plan to the smart gimbal, wherein the smart gimbal is configured to execute the sensor plan based on actual locations of the aerial vehicle within the flight corridor.

BRIEF DESCRIPTION OF DRAWINGS

The following drawings illustrate embodiments of the invention, which should not be construed as restricting the scope of the invention in any way.

DESCRIPTION

A. Glossary

Figure 1:
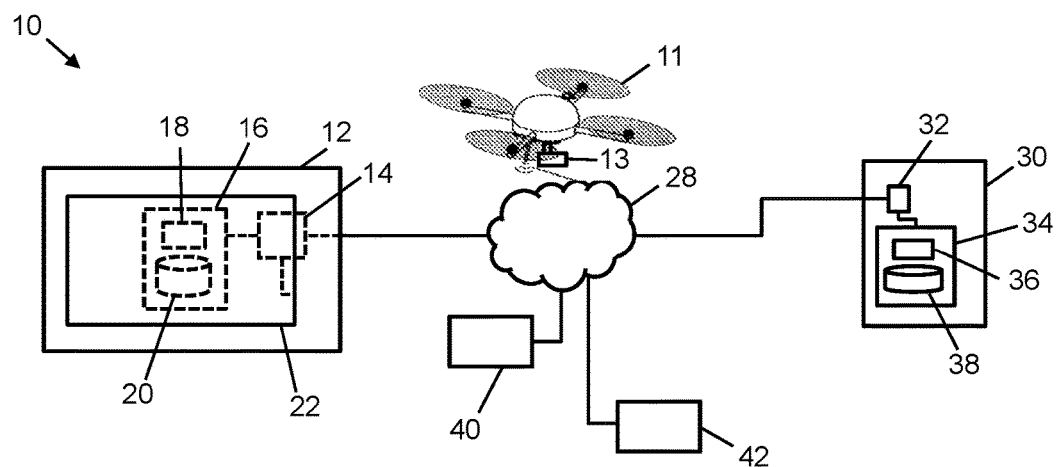
FIG. 1 is a schematic representation of a system for visualizing camera angles for objects of interest to be observed from a UAV, according to an embodiment of the present invention.

COI—Curve of interest.

The term "firmware" includes, but is not limited to, program code and data used to control and manage the interactions between the various modules of the system.

The term "gimbal" relates to a mechanism, typically consisting of rings pivoted at right angles, for keeping an instrument such as a sensor in a moving craft in a fixed orientation. The term may also be used to refer to a housing having such a mechanism. A "smart gimbal" provides a UAV or a MAV with additional computing power for controlling one or more sensors on the smart gimbal. For example, a smart gimbal can control a sensor according to an intended plan, despite the aerial vehicle not precisely following a specific flight path.

The term "hardware" includes, but is not limited to, the physical housing for a computer as well as the display screen, connectors, wiring, circuit boards having processor and memory units, power supply, and other electrical components.

LOI—Line of interest.

MAV—Manned aerial vehicle.

The term "model" refers to a 3D computer representation of a real-world OOI. Models are created by combining information from multiple photographs of the OOI taken from different angles.

The term "module" can refer to any component in this invention and to any or all of the features of the invention without limitation. A module may be a software, firmware or hardware module, and may be located in a user device, a MAV, a UAV, a smart gimbal or a server.

The term "network" can include both a mobile network and data network without limiting the term's meaning, and includes the use of wireless (e.g. 2G, 3G, 4G, WiFi, WiMAX™, Wireless USB (Universal Serial Bus), Zigbee™, Bluetooth™ and satellite), and/or hard wired connections such as internet, ADSL (Asymmetrical Digital Subscriber Line), DSL (Digital Subscriber Line), cable modem, T1, T3, fiber, dial-up modem, television cable, and may include connections to flash memory data cards and/or USB memory sticks where appropriate. A network could also mean dedicated connections between computing devices and electronic components, such as buses for intra-chip communications.

POI—Point of interest.

The term "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by code or a module. The processor, if comprised of multiple processors, may be located together or geographically separate from each other. The term includes virtual processors and machine instances as in cloud computing or local virtualization, which are ultimately grounded in physical processors.

The term "software" includes, but is not limited to, program code that performs the computations necessary for creating overlays for maps, calculating sensor plans and flight plans, determining camera on and off points, displaying information, and managing inputs and outputs.

The term "object of interest" (OOI) refers to a real-world, physical feature that is to be observed by a camera or a sensor on an aerial vehicle. An OOI may be a point of interest (POI), such as a power line pylon, a radio tower, a tree, etc. It may also be a line of interest (LOI), such as a straight wall or a straight pipeline. It may also be a curve of interest (COI), such as a coast line, a curved wall or a curved pipeline. An OOI is visible on a map displayed by the system.

The term "system" when used herein refers to a system for creating overlays for maps, the overlays representing angles from which OOIs are observed, the system being the subject of the present invention.

UAV—Unmanned aerial vehicle.

EXEMPLARY EMBODIMENT

Referring to FIG. 1, shown is an exemplary system 10 for visualizing camera angles when preparing a flight plan for a UAV 11 that carries sensor 13 (e.g. a camera). The system 10 includes or interacts with a user computing device 12, which may be a laptop or desktop computer, for example, or any other electronic device that provides the necessary equivalent functionality to fulfill the requirements of the invention. The user device 12 includes one or more processors 14 which are operably connected to computer readable memory 16 included in the device. The system 10 includes computer readable instructions 18 (e.g. an application) stored in the memory 16 and computer readable data 20, also stored in the memory. The memory 16 may be divided into one or more constituent memories, of the same or different types. The user device 12 includes a display screen 22, operably connected to the processor(s) 14. The display screen 22 may be a traditional screen, a touch screen, a projector, an electronic ink display or any other technological device for displaying information.

The user device 12 is connected to or into the system 10 via a network 28, which may, for example, be the internet, a telecommunications network, a local area network, a bespoke network or any combination of the foregoing. Communications paths in the network 28 may include any type of point-to-point or broadcast system or systems. The UAV 11 is connected to the network 28 wirelessly (e.g. by Bluetooth™) and optionally via a wired connection. Other users may have further user devices 40, 42 with functionally equivalent components to those of device 12, which may also be part of, or connected to, the system 10. User devices 40, 42 may be portable or non-portable computing terminals.

The system 10 also includes a server 30, which has one or more processors 32 operably connected to a computer readable memory 34, which stores computer readable instructions 36 and computer readable data 38. Data 38 may be stored in a relational database, for example. Some or all of the computer readable instructions 18, 36 and computer readable data 20, 38 provide the functionality of the system 10 when executed or read by one or more of the processors 14, 32. Computer readable instructions may be broken down into blocks of code or modules.

Figure 2:
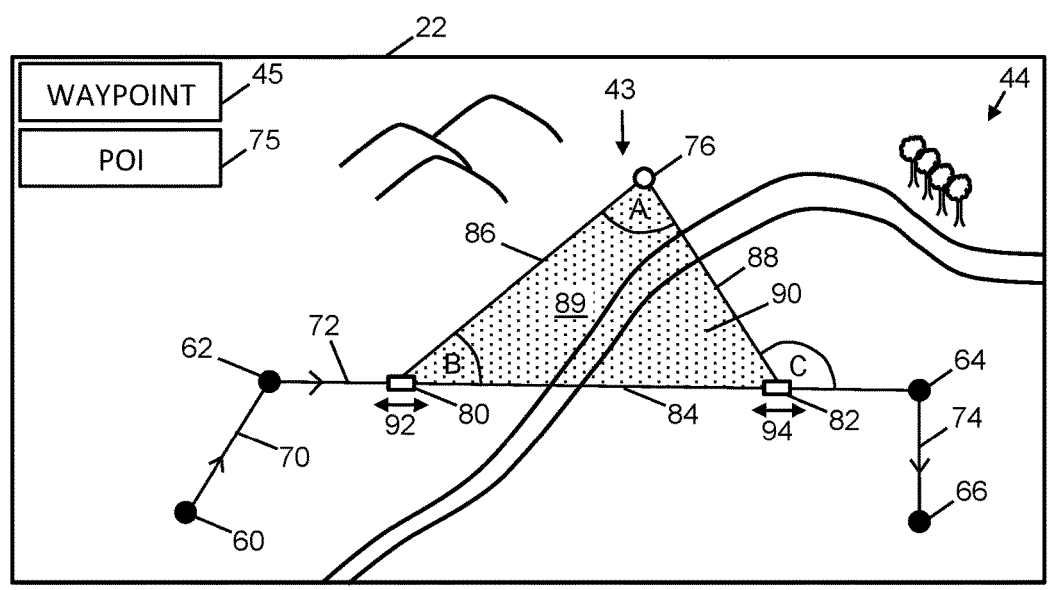
FIG. 2 is a schematic representation of a flight path, point of interest and range of camera angles that are overlaid on a map, according to an embodiment of the present invention.

Referring to FIG. 2, an overlay 43 for a map 44 displayed on the screen 22 is shown, which is created during the creation of a flight plan for a UAV 11. While a map is displayed on the screen 22, the user clicks a Waypoint button 45 on the screen 22, for example, to enter a mode of the system 10 that allows waypoints to be inputted to the system. The user clicks on various points on the map, to create waypoints at point 60, point 62, point 64, and point 66. As this is done, the system 10 draws connecting lines 70, 72, 74 on the screen 22, connecting the waypoints 60, 62, 64, 66 in the order in which they were created. The UAV 11, when loaded with the flight plan, will follow these lines 70, 72, 74 in the direction shown by the arrows on the lines. The final waypoint 66 may be made coincident with the initial waypoint 60, as the user desires.

After the waypoints 60, 62, 64, 66 have been created, the user clicks a POI button 75 displayed on the screen 22 so that the system 10 enters a mode for entering POIs. In this mode, the POI 76 is created by the user clicking on the corresponding location on the map. Automatically, the system 10 creates an On slider 80 and an Off slider 82, both located on the line 72 that is closest to the POI 76. The On slider 80 corresponds to the location in the flight path that the UAV 11 switches its onboard camera on. Likewise, the Off slider 82 corresponds to the location in the flight path where the UAV switches the camera off. With the creation of the sliders 80, 82, the system 10 also creates the sides 84, 86, 88 of a triangle 89, joining the POI 76, the On slider 80 and the Off slider 82. Side 84 is optional, as it is coincident with the line 72. The sides 86, 88 of the triangle may be said to terminate at line 72 of the flight plan even though they are obscured by the On and Off sliders. The triangle 89 is shaded with a partially transparent fill color 90, so that the detail of the underlying map 44 remains visible. Side 86 of the triangle 89 corresponds to the direction of the camera shot when the camera is first switched on to observe the POI 76. Side 88 of the triangle 89 corresponds to the direction of the camera shot immediately before it is switched off, or at the moment it is switched off. Sides 86, 88 connect planned locations of the UAV to the location of the POI 76. Due to the display of the triangle 89 overlaid on the map 44, a user can easily visualize the angle A through which the POI 76 is viewed and recorded by the camera. Angle B is the starting angle of the camera's line of focus relative to the flight path line 72, and angle C is the ending angle of the camera's line of focus, again relative to the flight path line 72. As the angles A, B, C have been described from a point of view of directly above the map and flight plan, the actual angles set will need to be compensated for the angle of dip, which will depend on the altitude of the flight path relative to the POI 76.

As indicated by arrows 92, 94, the user is able to click and drag the sliders 80, 82 along the line 72 of the flight path in order to change the on and off points for the camera, and thereby to change the angle A through which the POI 76 is recorded. As the sliders 80, 82 are adjusted, the triangle 89 is correspondingly adjusted.

The user may also get a feel for the duration of time that the camera is focused on the POI 76, which, taking into account the intended speed of the UAV 11, will be proportional to the length of side 84 of the triangle 89.

Figure 3:
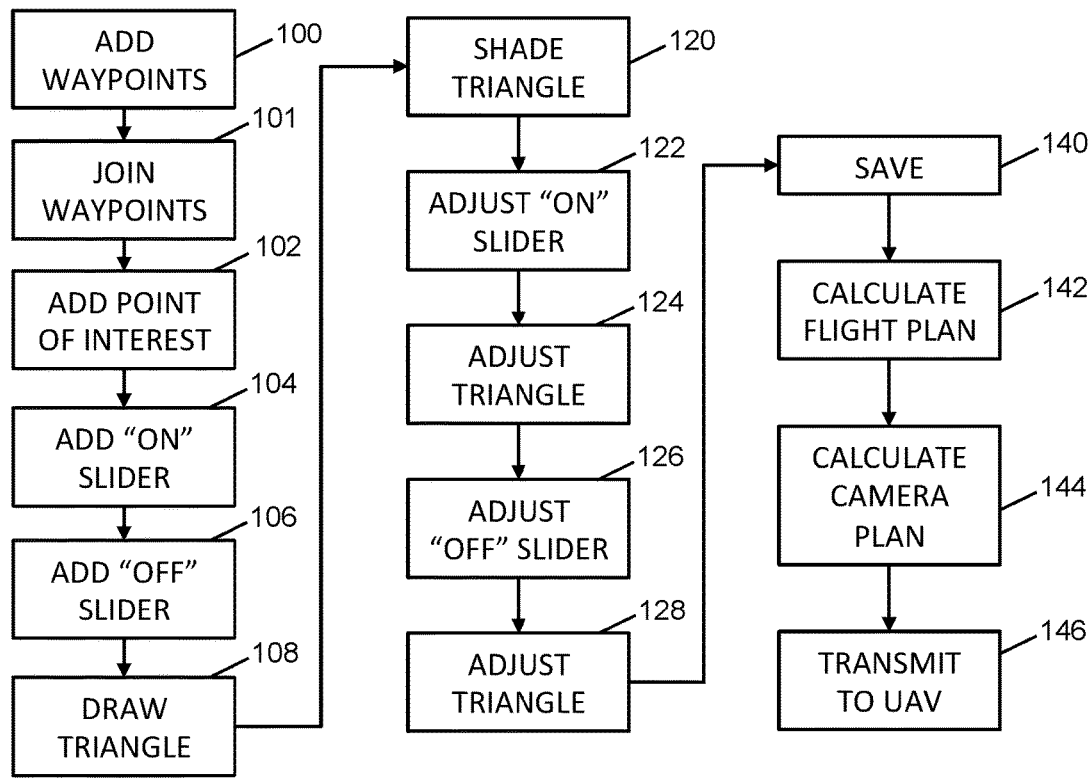
FIG. 3 is a flowchart of a process that the system undertakes for defining and visualizing a range of camera angles according to an embodiment of the present invention.

Referring to FIG. 3, a flowchart is shown that the system 10 performs when a user is setting up a flight plan and setting up the viewing of a POI 76. In step 100, the user enters at least two waypoints, which the system automatically joins with one or more flight path lines in step 101. In step 102, the user adds a POI. In response to the definition of a POI, the system adds an On slider in step 104, an Off slider in step 106, a triangle in step 108, and partially transparent shading for the triangle in step 120. The sliders and the triangle are automatically displayed on the screen at the same time as the waypoints and POI. Next, in step 122, the user adjusts the position of the On slider, in response to which the system adjusts the triangle accordingly in step 124. In step 126, the user adjusts the position of the Off slider, in response to which the system again adjusts the triangle accordingly in step 128. In step 140, the user can save the parameters of the flight plan, including the parameters for recording the POI. The parameters for recording the POI may include the number of frames per second, the resolution, the zoom level, the way the camera angle changes throughout the flight plan, etc. In step 142 the system 10 calculates the flight plan instructions which need to be followed by the UAV. In step 144, the instructions for the camera are prepared in a camera plan. In step 146, the instructions for the flight plan and the camera plan are transmitted from the system 10 to the UAV 11.

Variations

In other embodiments, the triangle may not be shaded, as it may by sufficient for some users to visualize the camera angles with only the edges of the triangle. In these embodiments, steps 122-128 would be omitted or optional.

Figure 4:
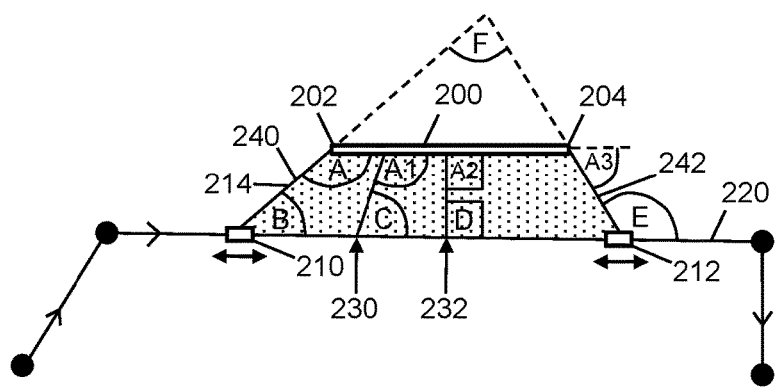
FIG. 4 is a schematic representation of a flight path, line of interest and range of camera angles that are to be overlaid on a map, according to an embodiment of the present invention.

Referring to FIG. 4, the system 10 may also be used to visualize camera angles for a line of interest (LOI) 200. A LOI may correspond to a part of a pipeline, a wall, a highway, a hedge, etc. After the waypoints have been input, the line is defined by selecting a LOI button, clicking on the map at the starting point 202 of the LOI, and then clicking on an ending point 204 of the LOI. When the LOI 200 has been input, the system 10 automatically displays two sliders 210, 212 on the line 220 marking the nearest leg of the flight path. The On slider 210 marks the location in the flight path where the camera is switched on by the UAV 11. The Off slider 212 marks the location in the flight path where the camera is switched off by the UAV. The system 10 displays a transparent, shaded quadrilateral 214 overlaid on the map, joining the On slider 210, the start 202 of the LOI 200, the end 204 of the LOI, and the Off slider 212.

Angle A shows the direction from which the camera views the LOI 200 immediately after the camera is switched on. As the flight progresses, the angle at which the LOI 200 is observed gradually changes to angle A1, and then to angle A2 (perpendicular to the flight path) and so on to angle A3 immediately before, or when, the camera is switched off. Note that the LOI 200 does not need to be parallel to the closest line of flight 220. The camera is controlled to gradually change its viewing angle relative to the direction of flight. When the camera is turned on, its viewing direction is at an angle B to the direction of flight 220. At point 230 on the line 220 of flight, the camera is pointed at an angle C relative to the line of flight 220. At point 232, the camera is aimed at angle D, i.e. perpendicular to the line of flight 220. When the camera is switched off, it is aimed at a direction at an angle E to the line of flight 220. All these angles need to take into account and compensate for the angle of dip, which depends on the altitude of the UAV 11 relative to the LOI 200. As the LOI 200 may represent a geographical feature which varies in height, this must also be taken into account. The angle F between the lines 240, 242 at opposite sides of the quadrilateral 214 represents the overall range of angles through which the LOI 200 is observed.

The sliders 210, 212 may be adjusted as described above. As they are adjusted, the displayed quadrilateral 214 is correspondingly adjusted.

Figure 5:
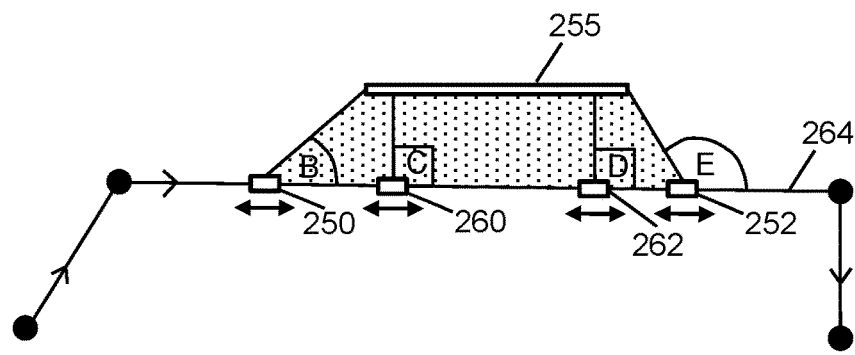
FIG. 5 is a schematic representation of a flight path, line of interest and range of camera angles that are to be overlaid on a map, with additional sliders for defining perpendicular viewing, according to an embodiment of the present invention.

Referring to FIG. 5, as well as an On slider 250 and an Off slider 252 being displayed for a LOI 255, additional sliders 260, 262 may also be displayed between the On and Off sliders. The first inner slider 260 marks the location where the camera angle is set to become perpendicular to the closest leg 264 of the flight path, after having gradually changed from initial angle B at the switch-on of camera recording. The second inner slider 262 marks the location where the camera angle is set to stop being perpendicular to the closest leg 264 of the flight path, after which it will gradually change to final angle E at the switch-off of camera recording. Again, angles should take into account the altitude of the UAV.

Figure 6:
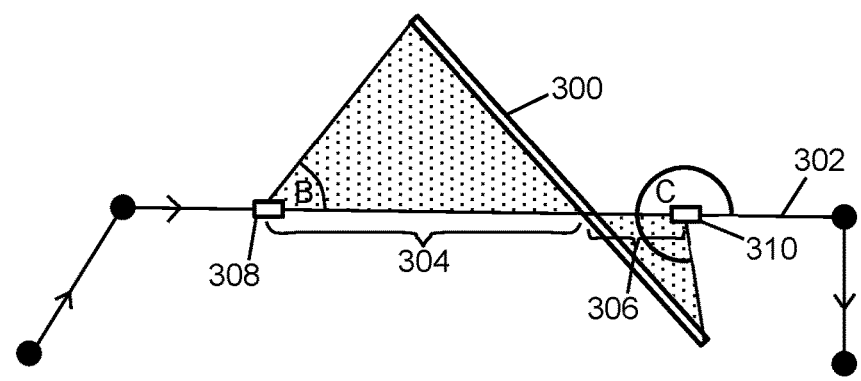
FIG. 6 is a schematic representation of a flight path traversing a line of interest, and a range of camera angles that are to be overlaid on a map, according to an embodiment of the present invention.

Referring to FIG. 6, an example is shown where the LOI 300 crosses under the flight path 302. In section 304 of the flight path 320, the camera is pointed to the left, at angle B, or close to angle B most of the time. As the UAV flies over the LOI, the camera angle is changed relatively rapidly, focusing downwards and then towards the right. In section 306 of the flight path 302, the camera is pointed to the right at an angle that ends up equal to angle C, or depending how measured, angle (360°-C). This demonstrates that the variation in camera angle is not necessarily proportional to the distance progressed along the line of flight 302. Depending on the embodiment, the angle of the camera can be set to pan along the LOI in proportion to the UAV's progression between On point 308 and Off point 310, i.e. to pan the camera uniformly along the LOI. In another embodiment, the camera may be programmed to always focus (where possible) on the nearest point of the LOI 300, which means that the viewing angle to the LOI is perpendicular to it.

Figure 7:
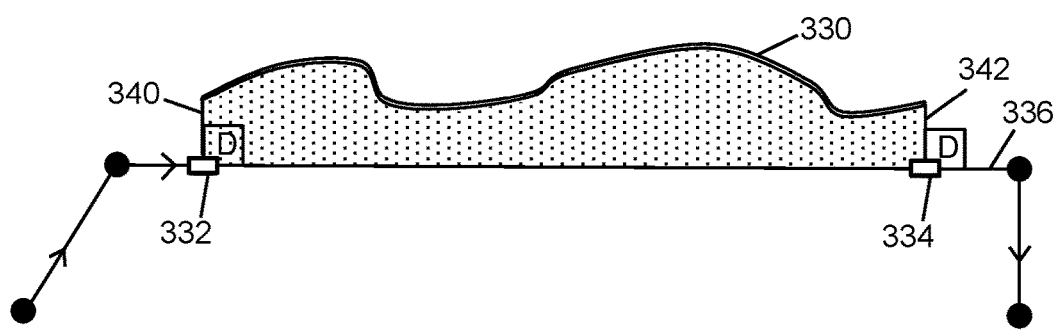
FIG. 7 is a schematic representation of a flight path, curve of interest and range of camera angles that are to be overlaid on a map, according to an embodiment of the present invention.

Referring to FIG. 7, the system may be configured to track a curve of interest (COI) 330. A COI may be a coastline, a pipeline, a railway, a forest edge, a river, etc. In this embodiment, the initial placement of the sliders 332, 334 may be such that the viewing angle D is always perpendicular to the line of flight 336. In other embodiments, the angle of observation may be fixed, but at an angle other than perpendicular. As a result, the angle between parallel lines 340 and 342, representing the directions of the sensor at switch-on and switch-off respectively, is 0°.

Figure 8:
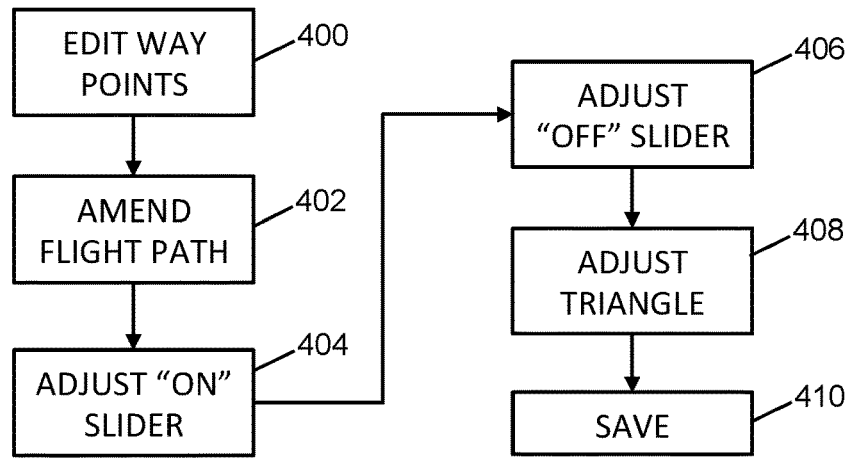
FIG. 8 is a flowchart of a process that the system undertakes for editing and visualizing a range of camera angles according to an embodiment of the present invention.

FIG. 8 shows a flowchart for editing the flight plan. In step 400, one or more of the waypoints are moved, e.g. by entering an edit mode and clicking and dragging the waypoints to different positions on the map. When a specific waypoint is moved, the flight paths that connect to that waypoint are automatically amended, in step 402. They are adjusted so that they remain connected to the waypoint. If a flight path has sliders on it for marking the on and off locations of an onboard camera, these sliders are automatically moved with the flight path, in steps 404 and 406. Their positions along the amended flight path are proportional to their original positions along the initial flight path. As the positions of the sliders are changed, the triangle representing the camera viewing angles is also automatically changed, in step 408. In step 410, the new flight path and camera plan is saved.

Further Variations

Multiple points of interest may be entered into the flight plan. The system may automatically prevent overlapping of the observation times if there is only one camera on board. Alternately, overlapping may be allowed if there are multiple cameras.

Instead of, or as well as, a camera, a sensor may be used, such as an infra-red sensor, a chemical sensor, a temperature sensor, a humidity sensor, etc.

If there are obstacles encountered when the UAV is actually flying according to a programmed flight path, such as electricity pylons, then automatic avoidance procedures can be used to temporarily override the flight plan, and divert the UAV around the obstacle. During the diversion, the camera can still be aimed at the POI, or the closest point on the LOI or COI. For example, the camera could be programmed to be always perpendicular to a LOI, even if the UAV moves further away from it or closer to it because of an obstacle. In another embodiment, the camera may be programmed to point in the same direction it would have pointed in the absence of the obstacle.

In some embodiments, a curved flight path line may join two waypoints. An adjustment point on the curve may be clicked and dragged to either side (of the original curve) to change the amount of curvature. The adjustment point on the curve may be slid along the curve to change the location of maximum deviation from what would be a straight-line flight path.

In some embodiments, the line of flight joining two waypoints may be a sine wave instead of being a straight line. The centerline, amplitude, period and phase of the sine wave may be adjusted by clicking and dragging on the sine wave displayed on the screen 22. Shapes other than sine waves may be used, such as sawtooth waves, square waves, etc. Angles of view would then be shaded in from the varying flight path to the LOI of COI.

Known image analysis and/or ranging techniques may be used to help lock the camera onto a POI, LOI or COI during the actual flight.

It is possible to use the system in conjunction with citizen mapping. For example, a map of the world is shown, with POIs, LOIs and COIs that have actually been used for filming or photographing, as well as the angles of view. This requires feedback from the UAVs and uploads of the images and/or videos captured to the server 30. As more and more people use the UAVs and visualization system to capture ortho-normalized photos, for example, the map is filled in. The system is then used to monetize the data for the owners of the photos by selling subscriptions, for example. In another embodiment, a time slider could be used to animate photos that have daily changes or longer term changes. Known methods for providing a reward and/or incentive to a user based on the value of the user's content could be employed, for example, methods such as those described in U.S. Pat. No. 8,862,497, entitled "Method and system of determining and issuing user incentives on a web server via assessment of user-generated content relevance and value".

In some embodiments a further mode can be incorporated into the flight software. This mode is based upon a point and click navigation approach. While the UAV 11 is in flight, the user clicks on a location on the map on the screen 22 and the UAV moves to the newly clicked point and then hovers there. This mode is a hybrid between planning and executing. For example, the software shows the progression of the actual, real-time flight path as it is occurring. However if a new point is double clicked, or otherwise entered as a system command, during the flight, then the UAV 11 processes the command. To do this, it first makes sure that it is a complete command via a checksum, then overrides the last command. If the UAV 11 is hovering, then it goes to the newly requested location.

In some embodiments a pause function is included when flying a mission. During the mission, the UAV 11 can be paused at whatever point it is in its flight path, in which case it transitions into a loiter state. During the loiter state a display pops up on screen 22 that allows the user to modify the UAV's position and camera, and to resume the mission at any time. The UAV's position can be modified in real time, with a click of a button to position on the map a square box, for example, that describes a default 10 m×10 m box. The resulting real-time UAV control is based on telling the UAV its final position, the movement to which is executed in real time at a default speed. This is unlike other controls that would move the UAV 11 based on a directional command. An elevation slider or an absolute position widget can be used for elevation, for example. The default size and shape represented by the positional control is 10 m×10 m×10 m and can be modified to other dimensions and/or shapes in the settings, as well as the default speed for moving the UAV to such a position. The camera aiming can be done via conventional methods, such as point and click. Depending on the settings, the original mission may either be resumed from the point it was paused at, or from the nearest point on the original flight path to the present location of the UAV.

Figure 9:
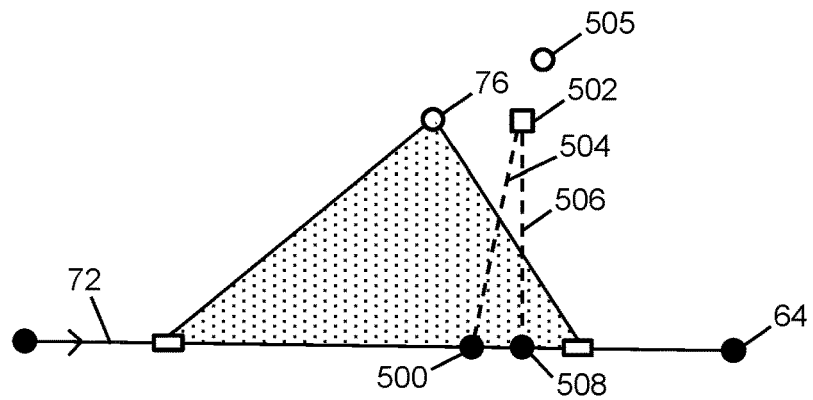
FIG. 9 is a schematic representation of a new location input during a paused flight.

For example, referring to FIG. 9, a UAV 11 which is on flight path 72 may be paused at point 500 and instructed to fly to point 502 defined by a square or other indicator positioned on the map by the user. Upon receiving a command from the user, via device 12, to fly to point 502, the UAV 11 flies along path 504 to point 502. At this point, the camera angle can be manually adjusted to focus on the point of interest 76 or another point of interest 505 in the vicinity. In other embodiments, the camera may be instructed to maintain its focus on the point of interest 76 that is was already focusing on. When the user instructs the UAV to resume its mission, it can fly back to the original flight path along path 504 to point 500, or along path 506 to point 508, depending on the default configuration or an explicit instruction from the user. The UAV then completes the remainder of the original flight plan by flying along the last part of path 72 to end waypoint 64.

In other embodiments, one or more electromagnetic field sensors may be installed on the UAV 11, to allow the UAV to follow an electromagnetic field. For example, the UAV can follow a high voltage electrical line, by using a sensor to read the field and maintain a predefined distance from it. Use of the sensed electromagnetic field can be combined with geographic knowledge to create a modified flight path for the UAV. The flight path can be slightly corrected by the sensed EMF (electromotive force) signal, or it can be entirely created based on the signal. The flight path or a portion of it could be created in real-time if it is based entirely on the signal. This principle could be extended to other phenomena or signals (e.g. radiation, electro-optical, sound), using other known types of sensor. Basically, the UAV could be configured to follow anything that could be measured via wave propagation.

Figure 10:
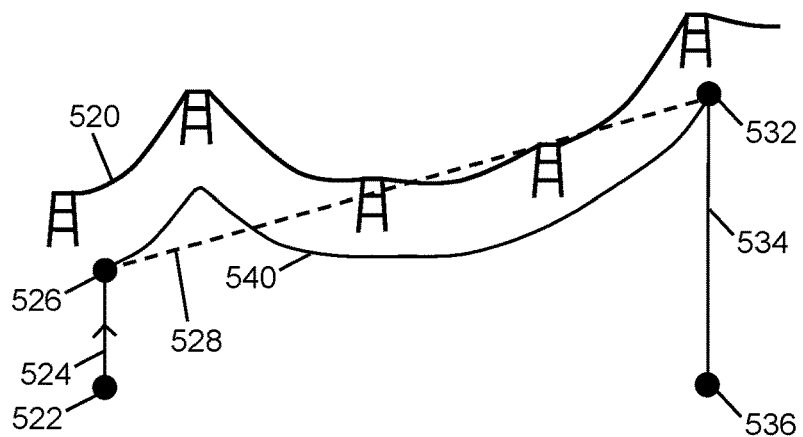
FIG. 10 is a schematic representation of a flight path that follows an electric field.

For example, referring to FIG. 10, a user may want the UAV 11 to follow high voltage line 520. A flight plan may be entered as before, from waypoint 522 along first leg 524 to waypoint 526, along second leg 528 to waypoint 532, then along third leg 534 to waypoint 536. The UAV 11 is instructed to follow an electric field signal while on leg 528, which results in the second leg of the flight being modified to path 540, while the UAV is in flight. The actual flight path 540 of the UAV is such as to maintain the electric field sensed on path 540 equal to the electric field first sensed at waypoint 526. The field sensed is to remain constant, or constant to within an acceptable tolerance, until the UAV reaches waypoint 532.

The points of interest (POIs) could be predefined via a common format such as KML (Keyhole Markup Language) or ESRI (Environmental Systems Research Institute) shapefiles and the waypoints may be generated based on: (1) flight path constraints (e.g. 45/90/45 degree angles at 100 meters); and/or (2) coverage constraints (e.g. a need to build an accurate 3D model of a tower, so need to fly progressive upward in a spiral while changing camera angles, which is fairly complex). The coverage constraints may be based on one or more of the following: desired model accuracy/resolution, model types, POI types (bridges, towers, power lines—and their dimensions), and modeling software input constraints. For example, flight paths may be generated based on POI types, e.g. tower with dimensions, and modeling software constraints. The modeling software needs pictures at certain intervals and certain angles. Given the POI dimensions and the software constraints, the system 10 generates a unique flight path for each POI, based on the type of POI, its dimensions and the modeling software input constraints.

Figure 11:
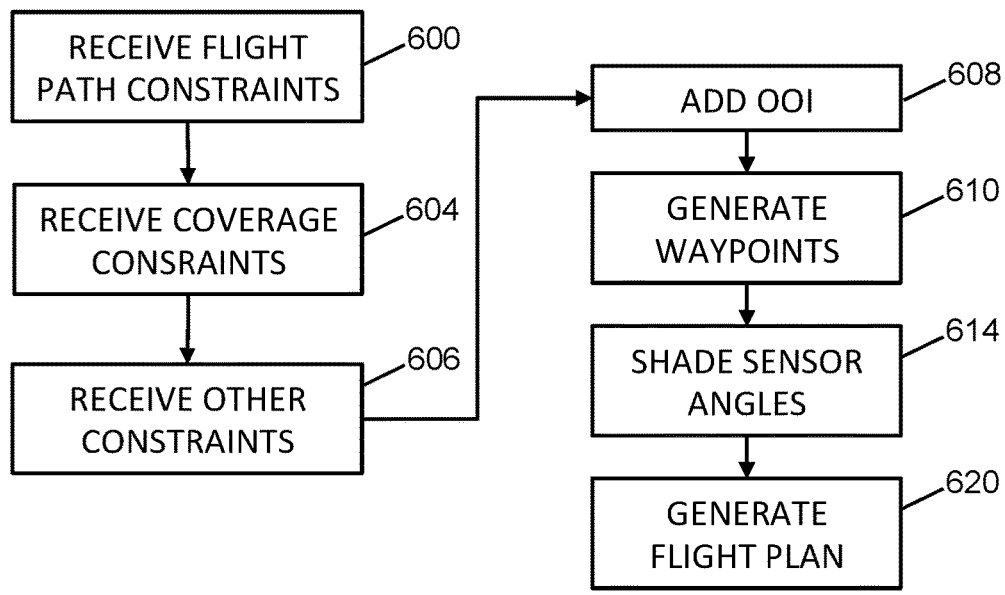
FIG. 11 is a flowchart of a process that the system undertakes for automatically generating waypoints.

For example, FIG. 11 shows a flowchart for the above process. In step 600, the system receives flight path constraints, such as the requirement for the flight path to consist of 100 m legs at 90° or 45° to a frame or line of reference. In step 604, the system receives coverage constraints, such as the desired resolution and percentage coverage of the OOI. In step 606, the system receives other constraints if there are any, such as the OOI type, the number of different angles from which to take a shot of the same part of the OOI, etc. In step 608, the system receives identification of an OOI from the user. In response, the system automatically generates the waypoints in step 610 and adds the semi-transparent shading showing the sensor angles around the OOI in step 614. After this, the flight plan is calculated in step 620.

Instead of the system 10 transmitting the flight plan and camera plan to the UAV 11, it may transmit the flight plan and camera plan to a full-scale, manned aerial vehicle (MAV) such as a piloted helicopter or plane. The system software as described in FIG. 3, steps 100-144, is used to plan a mission, which is then transmitted to a smart gimbal that is attached to a manned full-scale aerial vehicle. The smart gimbal carries the camera or other sensor and is described in U.S. Provisional Patent Application No. 62/383,354, which is fully incorporated herein by reference. During the flight, the pilot stays within a certain range of the calculated flight plan, for example, within a narrow flight corridor around the lines of the flight path 72 (FIG. 2) connecting the waypoints 62, 64. While the MAV is within the flight corridor, the smart gimbal adjusts its pointing direction automatically using the actual location (GPS) and orientation of the plane to calculate accurate angles for capturing POI data with the camera.

Figure 12:
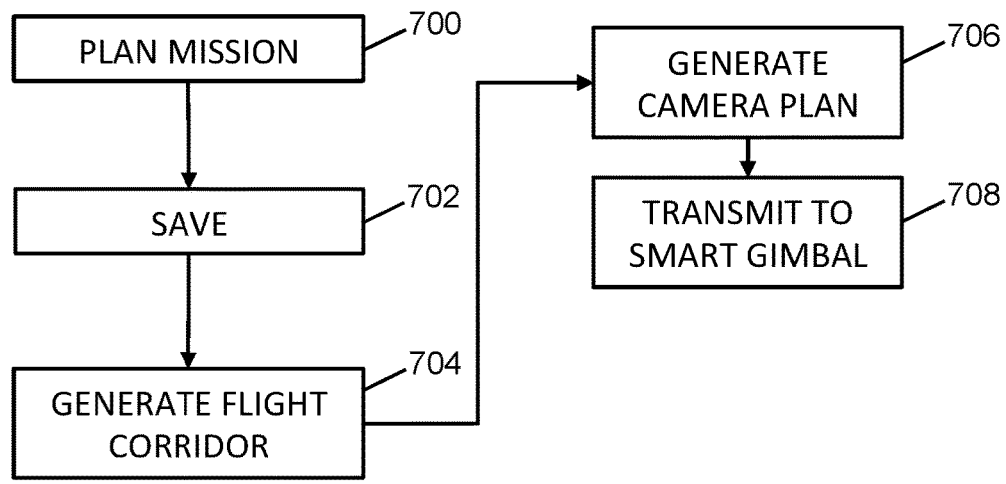
FIG. 12 is a flowchart of a process that the system undertakes for generating a flight plan for a smart gimbal.

A typical method using a smart gimbal is shown in FIG. 12. In step 700, the pilot pre-plans a mission with her user device 12 (FIG. 1). In this step, she adds waypoints and POIs, such as various power line towers along the flight path. She also selects how she wants the sensors to focus on the POIs she suggested, for example by adjusting the On and Off sliders, which results in a shaded polygon (or other shape) connected to each POI being displayed on the map. In step 702, the mission is saved. In step 704, a flight corridor is generated on the map, showing a shaded corridor around the lines joining the waypoints. The corridor is typically shaded with a different, semi-transparent color than the shading that represents the desired camera or sensor angles. The flight corridor tells the pilot the x, y (and possibly z) ranges she must stay within to collect accurate data. The range could be based on the sensor capability, the model constraints, or both. In step 706, a camera (or other sensor) plan is created based on the flight corridor, the POIs and the desired camera angles. The camera plan is then transmitted to the smart gimbal in step 708. The user device showing the flight plan is taken into the MAV or the flight plan is otherwise transferred to the MAV. During the flight, the smart gimbal directs the camera according to the camera plan, switching the camera on and off when the vehicle is at or in the vicinity of the On and Off slider locations respectively. Since the pilot may not maintain the MAV on the ideal flight path, the smart gimbal compensates for the actual position and orientation of the MAV during the flight by adjusting the camera angle and optionally a zoom level of the camera. If the pilot leaves the planned flight corridor accidentally, then the smart gimbal and/or flight monitoring software may alert her (e.g. visibly or audibly) so that she can return to the flight corridor. The smart gimbal is programmed to control the camera so that all desired angles of the POI are captured, even if the pilot leaves the flight corridor and then returns, and even if parts are omitted and then completed later.

In another embodiment, the pilot pre-plans a mission using the user device 12 by clicking on various POIs. A flight corridor is automatically generated on the map, showing a shaded area around the POIs (e.g. from over 180° up to 360°) and a shaded area around lines connecting the POIs. This shaded area tells the pilot the x, y (and possibly z) ranges she must fly within to collect accurate data. The shaded area around the POIs represents the desired camera angles. In this embodiment, the POIs are to be photographed from all around, i.e. from a range of angles greater than 180°. In other embodiments, the range of angles may be less than 180° if only one side of the POIs are to be viewed during the mission.

Although the present invention has been illustrated principally in relation to UAVs it also has wide application in respect of other autonomous vehicles such as rovers, or automatically controlled camera equipment on human-driven ground vehicles. It also has application to MAVs and other manned vehicles.

Lines that are shown as solid lines on the screen 22 may be replaced with lines that are dotted or dashed.

The positions of the On slider and Off slider may be coincident with the waypoints. Waypoints may define on and off positions of the sensors without the use of sliders.

In general, unless otherwise indicated, singular elements may be in the plural and vice versa with no loss of generality. The use of the masculine can refer to masculine, feminine or both.

Throughout the description, specific details have been set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that variations to the specific details disclosed herein can be made, resulting in other embodiments that are within the scope of the invention disclosed. Steps in the flowcharts may be performed in a different order, other steps may be added, or one or more may be removed without altering the main function of the system. Flowcharts from different figures may be combined in different ways. Overlays for maps may show more or less than the examples given herein. All parameters, dimensions and configurations described herein are examples only and actual values of such depend on the specific embodiment. Accordingly, the scope of the invention is to be construed in accordance with the substance defined by the following claims.

The invention claimed is:

1. A method for visualizing sensor angle with respect to a object of interest (OOI) that is to be observed by a sensor on an aerial vehicle, comprising:
    displaying, by a processor, a map on a screen;
    receiving, by the processor, an input identifying the OOI;
    displaying, by the processor, a first line from the OOI, wherein the first line represents an angle at which the sensor is switched on; and
    displaying, by the processor, a second line from the OOI, wherein the second line represents an angle at which the sensor is switched off;
    wherein an angle between the first and second lines represents a range of sensor angles from which the sensor observes the OOI.

2. The method of claim 1, wherein the aerial vehicle is an unmanned aerial vehicle (UAV), the method further comprising:
    receiving, by the processor, an input of at least two waypoints;
    displaying, by the processor, the waypoints on the screen;
    displaying, by the processor, a flight path joining the waypoints, wherein the first line and second line both terminate on the flight path;
    displaying, by the processor, an On slider where the first line terminates, at a first location on the flight path, wherein the first location is where the sensor is switched on; and
    displaying, by the processor, an Off slider where the second line terminates, at a second location on the flight path, wherein the second location is where the sensor is switched off.

3. The method of claim 2, further comprising:
    receiving, by the processor, an adjustment to the locations of one or both of the On slider and the Off slider, each location being adjustable along the flight path; and
    moving, by the processor, said first and/or second lines such that they each remain terminated at the On slider and Off slider respectively.

4. The method of claim 2, further comprising:
calculating, by the processor, a flight plan based on the waypoints and the flight path;
calculating, by the processor, a sensor plan based on the first and second locations and a location of the OOI; and
transmitting, by the processor, the flight plan and the sensor plan to the UAV.

5. The method of claim 4, wherein the sensor plan comprises an instruction to gradually alter the sensor angle from the angle at which the sensor is switched on to the angle at which the sensor is switched off as the UAV flies from the first location to the second location, such that the sensor continually points at the OOI between the first and second locations.

6. The method of claim 4, wherein the OOI is a line of interest and the flight plan includes an instruction to pan the sensor uniformly along the line of interest.

7. The method of claim 4, wherein the flight plan can be manually interrupted and resumed.

8. The method of claim 4, wherein the flight plan includes an instruction to lock the sensor onto the OOI between the location where the sensor is switched on to the location where the sensor is switched off.

9. The method of claim 4, wherein:
the OOI is an electrical power line;
the flight plan includes an instruction to maintain the UAV at a constant level of electric field in relation to the electrical power line while flying between the first location and the second location.

10. The method of claim 4 wherein the OOI is a line of interest, the method further comprising:
displaying, by the processor, first and second inner sliders on the flight path between the On slider and Off slider;
wherein the sensor is aimed perpendicularly to the flight path between the first and second inner sliders.

11. The method of claim 2, further comprising:
receiving, by the processor, an adjustment to the locations of one or both of the waypoints;
moving, by the processor, said On slider and Off slider such that they remain on the flight path; and
moving, by the processor, said first and/or second lines such that they each remain terminated at the On slider and Off slider respectively.

12. The method of claim 2, further comprising:
displaying, overlaid on the map, a shaded, semi-transparent area enclosed by the first line, the second line, the OOI and the flight path.

13. The method of claim 2, further comprising:
receiving, by the processor, an input identifying a further OOI;
displaying, by the processor, a third line from the OOI to the flight path, wherein the third line represents an angle at which the sensor is switched on; and
displaying, by the processor, a fourth line from the OOI, wherein the fourth line represents an angle at which the sensor is switched off;
wherein an angle between the third and fourth lines represents a range of sensor angles from which the sensor observes the further OOI;
displaying, by the processor, a further On slider where the third line terminates, at a third location on the flight path, wherein the third location is where the sensor is switched on; and
displaying, by the processor, a further Off slider where the fourth line terminates, at a fourth location on the flight path, wherein the fourth location is where the sensor is switched off;
wherein the first, second, third and fourth locations are arranged consecutively on the flight path.

14. The method of claim 1, wherein the OOI is a point of interest, a line of interest, or a line of interest that crosses underneath the flight path.

15. The method of claim 2, wherein:
the flight path is a straight line;
the flight path is a curve; or
the OOI is a line of interest and the flight path repetitively approaches and retreats from the line of interest.

16. The method of claim 1, wherein the OOI is a curve of interest and the angle between the first and second lines is 0°.

17. A system for visualizing sensor angle with respect to a object of interest (OOI) that is to be observed by a sensor on an aerial vehicle, comprising:
a processor;
a screen; and
a memory storing computer readable instructions, which, when executed by the processor, cause the processor to:
display a map on the screen;
receive an input identifying the OOI;
display, on the screen, a first line from the OOI, wherein the first line represents an angle at which the sensor is switched on; and
display, on the screen, a second line from the OOI, wherein the second line represents an angle at which the sensor is switched off;
wherein an angle between the first and second lines represents a range of sensor angles from which the sensor observes the OOI.

18. The system of claim 17, wherein the aerial vehicle is an unmanned aerial vehicle (UAV) and the computer readable instructions, when executed by the processor, further cause the processor to:
receive an input of at least two waypoints;
display the waypoints on the screen;
display, on the screen, a flight path joining the waypoints, wherein the first line and second line both terminate on the flight path;
display, on the screen, an On slider where the first line terminates, at a first location on the flight path, wherein the first location is where the sensor is switched on; and
display, on the screen, an Off slider where the second line terminates, at a second location on the flight path, wherein the second location is where the sensor is switched off.

19. The system of claim 18, wherein the computer readable instructions, when executed by the processor, further cause the processor to:
receive an adjustment to the locations of one or both of the On slider and the Off slider, each location being adjustable along the flight path; and
move said first and/or second lines such that they each remain terminated at the On slider and Off slider respectively.

20. The system of claim 18, wherein the computer readable instructions, when executed by the processor, further cause the processor to:
calculate a flight plan based on the waypoints and the flight path;

calculate a sensor plan based on the first and second locations and a location of the OOI; and transmit the flight plan and the sensor plan to the UAV.

21. The system of claim 20, further comprising:

the UAV, configured to execute the flight plan; and the sensor, configured to execute the sensor plan.

22. The system of claim 21, wherein the sensor is a camera.

23. The system of claim 18, wherein the computer readable instructions, when executed by the processor, further cause the processor to:

display, overlaid on the map, a shaded, semi-transparent area enclosed by the first line, the second line, the OOI and the flight path.

24. The system of claim 17, further comprising a smart gimbal mounted on the aerial vehicle, wherein the computer readable instructions, when executed by the processor, further cause the processor to:

receive an input of at least two waypoints;

display the waypoints on the screen;

display, on the screen, a flight corridor joining the waypoints, wherein the first line and second line both terminate in the flight corridor;

display, on the screen, an On slider where the first line terminates, at a first location in the flight corridor, wherein the first location is where the sensor is switched on; and display, on the screen, an Off slider where the second line terminates, at a second location in the flight corridor, wherein the second location is where the sensor is switched off;

calculate a flight plan based on the waypoints and the flight corridor;

calculate a sensor plan based on the first and second locations and a location of the OOI; and transmit the flight plan and the sensor plan to the smart gimbal, wherein the smart gimbal is configured to execute the sensor plan based on actual locations of the aerial vehicle within the flight corridor.

* * * * *